(12) United States Patent
Hung et al.

(10) Patent No.: US 9,377,501 B2
(45) Date of Patent: Jun. 28, 2016

(54) SEMICONDUCTOR WAFERS, AND TESTING METHODS THEREOF

(71) Applicant: Winbond Electronics Corp., Taichung (TW)

(72) Inventors: Hsi-Hsien Hung, Fremont, CA (US); Johnny Chan, Fremont, CA (US); Dennis Cheng, Fremont, CA (US)

(73) Assignee: WINBOND ELECTRONICS CORP., Taichung (TW)

( * ) Notice: Subject to any disclaimer, the term of this patent is extended or adjusted under 35 U.S.C. 154(b) by 102 days.

(21) Appl. No.: 14/178,732

(22) Filed: Feb. 12, 2014

(65) Prior Publication Data

US 2015/0226785 A1 Aug. 13, 2015

(51) Int. Cl.
*G01R 31/26* (2014.01)
*G01R 31/28* (2006.01)
*G09C 1/00* (2006.01)

(52) U.S. Cl.
CPC ........ *G01R 31/2607* (2013.01); *G01R 31/2884* (2013.01); *G09C 1/00* (2013.01); *H04L 2209/12* (2013.01)

(58) Field of Classification Search
CPC ............... H01L 22/34; G01R 31/2884; G01R 31/2851; G01R 31/2831; G01R 31/318511
See application file for complete search history.

(56) References Cited

U.S. PATENT DOCUMENTS

| | | | | |
|---|---|---|---|---|
| 7,346,466 B2* | 3/2008 | Sato | | 702/104 |
| 2002/0158651 A1* | 10/2002 | Masuda | | 324/765 |
| 2012/0254626 A1* | 10/2012 | Arai | | 713/189 |
| 2012/0326146 A1* | 12/2012 | Hui et al. | | 257/48 |
| 2013/0240882 A1* | 9/2013 | Bonart | | 257/48 |

FOREIGN PATENT DOCUMENTS

| | | |
|---|---|---|
| CN | 1134017 C | 1/2004 |
| CN | 102881329 A | 1/2013 |

* cited by examiner

*Primary Examiner* — Tung X Nguyen
*Assistant Examiner* — Feba Pothen
(74) *Attorney, Agent, or Firm* — Muncy, Geissler, Olds & Lowe, P.C.

(57) ABSTRACT

The invention provides a semiconductor wafer with a die area and a scribe area, and the semiconductor wafer includes a die and a testing circuit. The die is formed on the die region of the semiconductor wafer, and the die includes a main circuit. The testing circuit is disposed on the scribe area of the semiconductor wafer, and is electrically connected to the die for testing the main circuit.

6 Claims, 5 Drawing Sheets

SEMICONDUCTOR WAFERS, AND TESTING METHODS THEREOF

BACKGROUND OF THE INVENTION

1. Field of the Invention

The present invention relates to semiconductor wafers, and more particularly to a semiconductor wafer having an off-chip testing circuit for testing a die.

2. Description of the Related Art

Nowadays, in a conventional semiconductor wafer manufacturing process, an integrated circuit formed in a die (also as a chip) needs to be tested for functionality, process integrity, device behavior, and reliability, etc. FIG. 1 shows a top view of a conventional semiconductor wafer 10, the semiconductor wafer 10 comprises a plurality of dies 12 formed on die areas 14 of the semiconductor wafer 10, and the other area on the semiconductor wafer may be defined as a scribe area 16. Also, in a conventional semiconductor wafer 10, a testing circuit 18 for testing the integrated circuit of the die is also formed in the die within the die areas 14. However, because the testing circuit 18 is embodied in the die, the size of the die may be increased. In other words, the die area for the main integrated circuit is relatively reduced. Also, due to the concern of die size, the testing functions of the testing circuit may need to be reduced.

In addition, the testing circuit 18 of the conventional semiconductor wafer 10 may provide a test interface (conductive pad, conductive bump) for an external test apparatus, such that the external test apparatus may obtain the test information or test results for determining whether the tested die works. However, a hacker may uses the test interface to steal information from the integrate circuit of the die, it may be insecure. Therefore, an improved testing circuit and method is needed.

BRIEF SUMMARY OF THE INVENTION

In order to solve the problem mentioned above, the invention provides a semiconductor wafer with a die area and a scribe area, and the semiconductor wafer comprises a die and a testing circuit. The die is formed on the die region of the semiconductor wafer, and the die comprises a main circuit. The testing circuit is disposed on the scribe area of the semiconductor wafer, and electrically connected to the die for testing the main circuit. In some embodiments of the invention, the testing circuit may have two portions, a portion of testing circuit is disposed on the scribe area, and another portion of the testing circuit is disposed on the die area.

In an embodiment of the invention, the semiconductor wafer further comprises a seal ring and a well. The seal ring is disposed outside of the die, and the well is formed below the seal ring. The testing circuit is electrically connected to the die via the well.

In an embodiment of the invention, when testing the main circuit, the testing circuit transmits test data to the main circuit. The main circuit transmits response data to the testing circuit when it receives the test data, and then the testing circuit determines whether the response data is equal to the test data for detecting the connection integrity.

In an embodiment of the invention, the die further comprises a decryption circuit connected between the main circuit and the testing circuit. The testing circuit encrypts the test data and transmits the encrypted test data to the decryption circuit of the die, and the decryption circuit decrypts the encrypted test data. The main circuit transmits the response data to the testing circuit according to the test data from the decryption circuit.

In an embodiment of the invention, the die further comprises a non-volatile memory fuse storing values for determining a function of the main circuit. The testing circuit provides a high voltage to the non-volatile memory fuse for performing an erase operation or a program operation.

The invention further provides a testing method for a semiconductor wafer having a die area and a scribe area. The testing method comprises: forming a die on the die region of the semiconductor wafer, and the die comprises a main circuit; forming a testing circuit on the scribe area of the semiconductor wafer; and electrically connecting the testing circuit to the die for testing the main circuit.

In an embodiment of the invention, the testing method further comprises: forming a seal ring disposed outside of the die; and forming a well electrically connecting the testing circuit to the main circuit of the die. In addition, the well is disposed below the seal ring.

In an embodiment of the invention, the testing method further comprises: using the testing circuit to transmit test data to the main circuit; receiving response data from the main circuit by the testing circuit; and determining whether the response data is equal to the test data. In addition, the main circuit generates the response data according to the test data.

In an embodiment of the invention, the die comprises a decryption circuit connected between the main circuit and the testing circuit. In the embodiment, the testing method further comprises: encrypting the test data; transmitting the encrypted test data to the decryption circuit; and decrypting the encrypted test data by the decryption circuit. In addition, the main circuit transmits the response data according to the test data from the decryption circuit.

In an embodiment of the invention, the die further has a non-volatile memory fuse storing values for determining a function of the main circuit. In the embodiment, the testing method further comprises: using the testing circuit to provide a high voltage to the non-volatile memory fuse for performing an erase operation.

BRIEF DESCRIPTION OF DRAWINGS

The invention will become more fully understood by referring to the following detailed description with reference to the accompanying drawings, wherein.

DETAILED DESCRIPTION OF THE INVENTION

Figure 1:
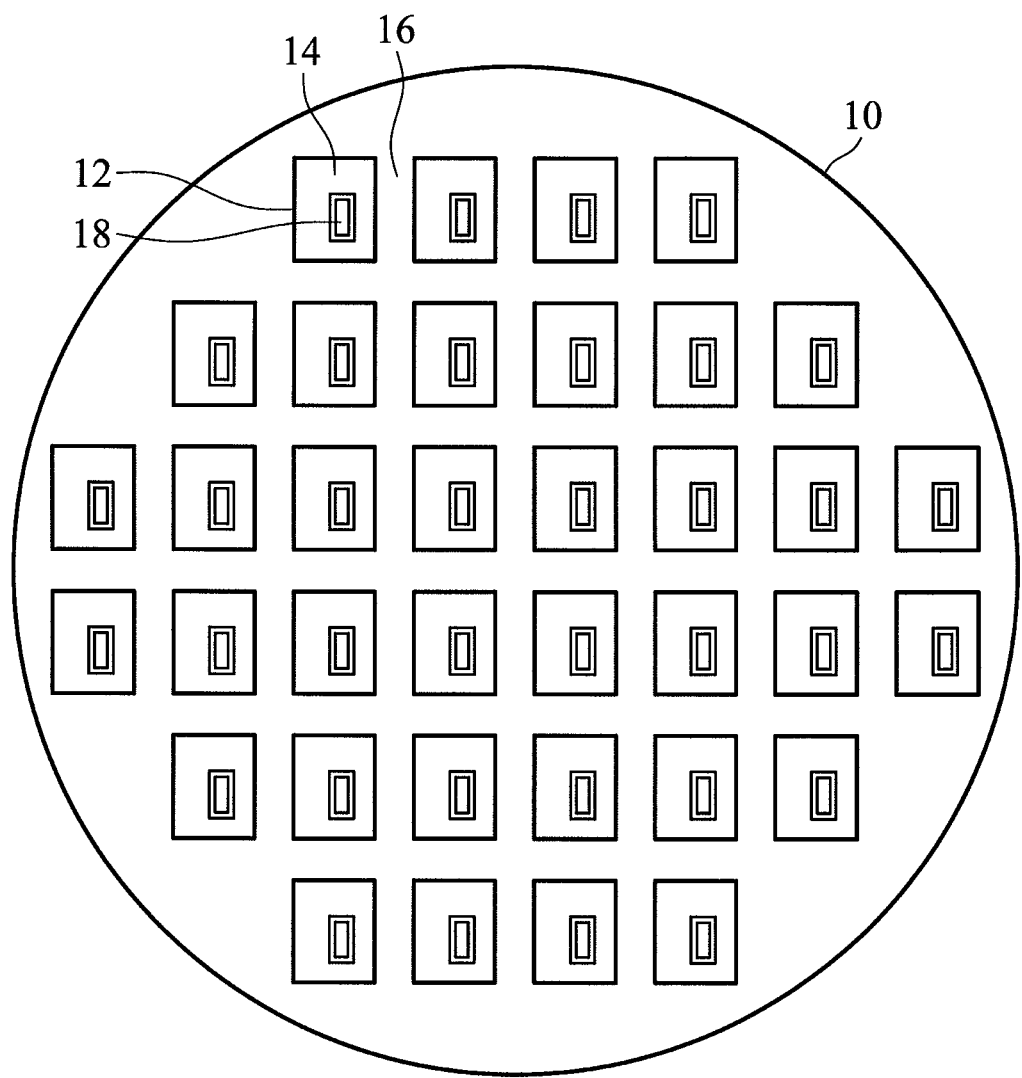
FIG. 1 is a top view of an embodiment of a conventional semiconductor wafer including multiple dies and test circuits.

Several exemplary embodiments of the application are described with reference to drawings, which generally relate to navigation of a movable platform. It is to be understood that the following disclosure provides various different embodiments as examples for implementing different features of the application. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Figure 2:
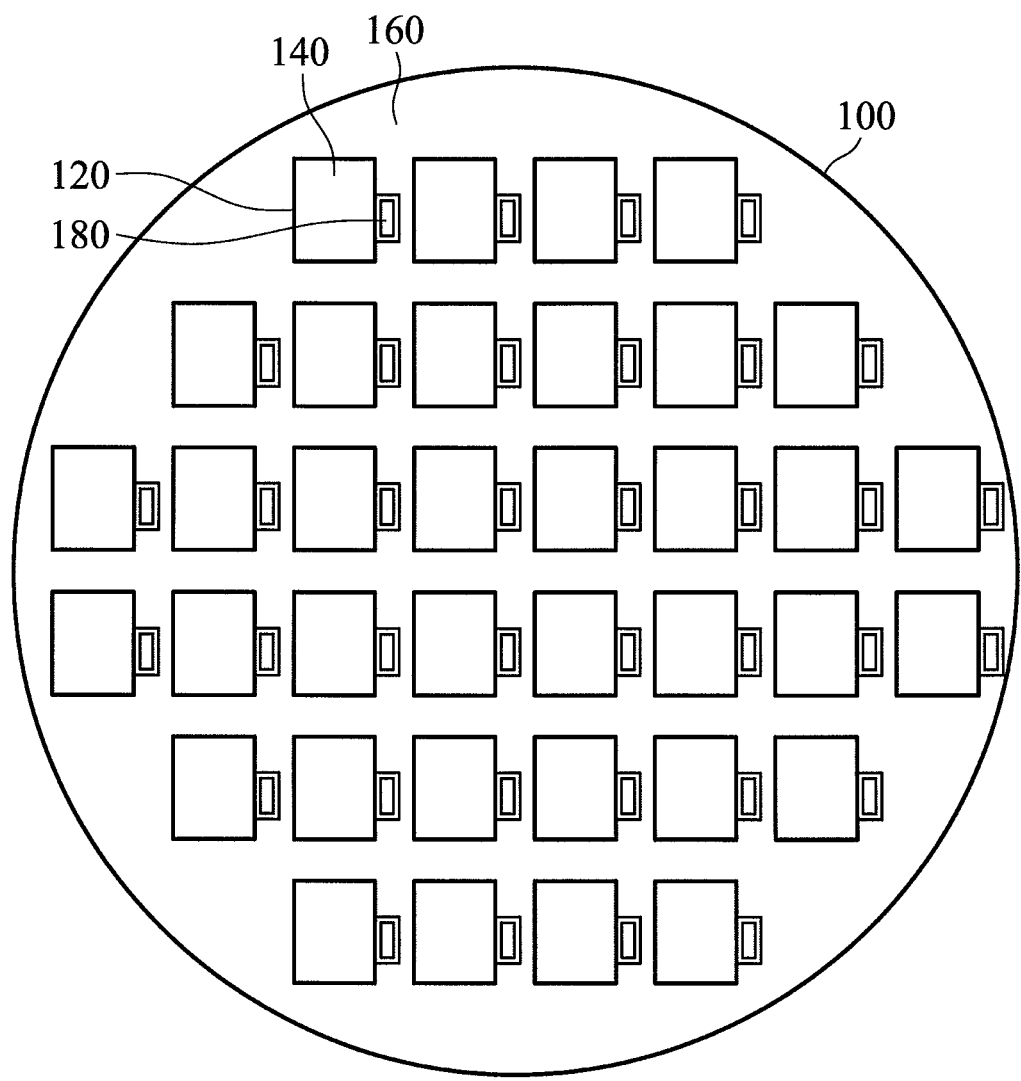
FIG. 2 is a top view of a semiconductor wafer including multiple dies and test circuits in accordance with an embodiment of the present invention.

FIG. 2 is a top view of a semiconductor wafer including multiple dies and test circuits in accordance with an embodiment of the present invention. In the embodiment, the semiconductor wafer 100 comprises multiple dies 120 and multiple testing circuits 180. The dies 120 are disposed on the respective die areas 140 of the semiconductor wafer 100, and the testing circuits 180 are disposed on the scribe area 160. Also, the individual testing circuits 180 are disposed next to the dies 120, and the testing circuit 180 is electrically connected to the corresponding die 120 for testing the main circuit formed in the die 120.

In an embodiment, when testing the main circuit in the die 120, the testing circuit 180 may test the main circuit via the electrical connection path. For example, the testing circuit 180 can communicate with the main circuit in the die 120 via the connection path, and the testing circuit 180 determines the test result of the die 120 according to the response of the main circuit. It should be noted that the testing circuit 180 may provide different combinations of command, data, and/or external bias signals (hereafter referred to as "testing signals"), to the main circuit in the die 120 according to the testing purpose. Also, the main circuit in the die 120 may have a dedicated bus for the testing purpose, and the dedicated bus receives the testing signals from the testing circuit 180. In addition, the main circuit in the die 120 may have a general data bus, and the general data bus can receive the testing signals for the testing purpose after synchronization between the main circuit in the die 120 and the testing circuit 180 is established. In the semiconductor wafer manufacturing process, the dies 120 may cut into individual components by removing the scribe area 160, after the tests of the dies 120 finish. Accordingly, a hacker cannot use the testing circuit 180 to access the information in the die 120, because the testing circuit 180 formed on the scribe area 160 has also been removed in the process. The details about the test of dies are discussed later.

In an embodiment of the invention, the testing circuit 180 may transmit test data to the main circuit of the die 120 for detecting the connection integrity. When the main circuit of the die 120 receives the test data, the main circuit may transmit response data to the testing circuit 180. Finally, the testing circuit 180 determines whether the connection works according to the response data from the main circuit of the die 120. For example, when detecting the connection integrity, the testing circuit 180 may determine whether the response data is equal to the test data. When the response data is equal to the test data, the testing circuit 180 may define the connection as fine. When the response data is not equal to the test data, the testing circuit 180 may define the connection as a failure. In some embodiments, for security reasons to prevent a hacker from entering the test mode, data from the testing circuit 180 can be encrypted, and the main circuit in the die 120 may decrypt the received data to determine whether the data is driven from the trusted source. Also, the synchronization is established when the data received by the main circuit in the die 120 is driven from the trusted source.

It should be noted that there may be an external test apparatus in some embodiments. In this embodiment, the testing circuit may provide an output terminal for the external test apparatus, and the external test apparatus can gather test information from the testing circuit 180. In some embodiments, the testing circuit may provide an input terminal for the external test apparatus, and the external test apparatus can control the testing circuit 180 for processing the test.

Figure 3:
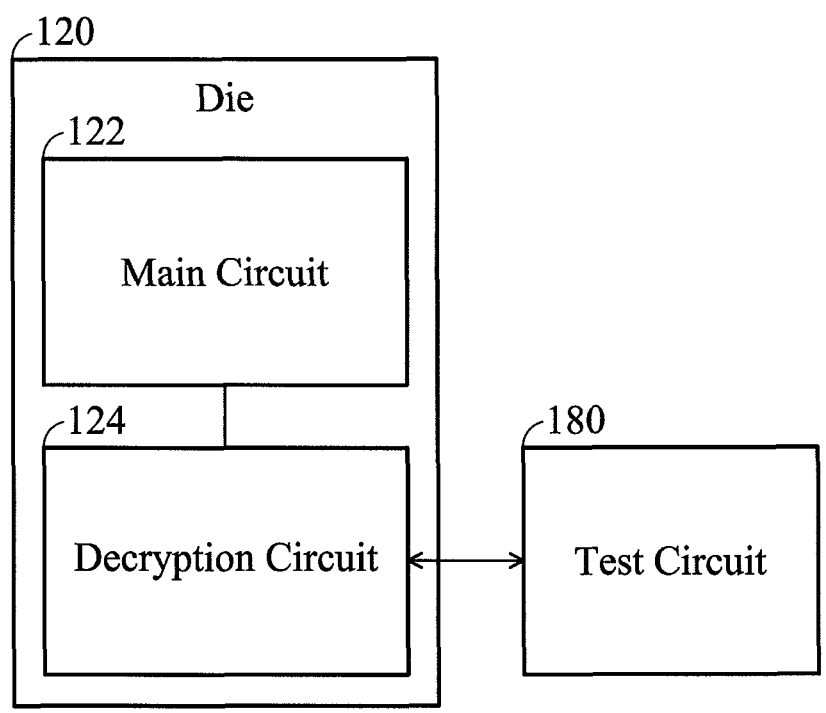
FIG. 3 is a schematic diagram illustrating an embodiment of a die and a testing circuit in accordance with an embodiment of the present invention.

For improving the security of information in the main circuit of the die, the invention further provides a decryption system. FIG. 3 is a schematic diagram illustrating an embodiment of a die and a testing circuit in accordance with an embodiment of the present invention. In the embodiment of the invention, the die 120 comprises a main circuit 122 and a decryption circuit 124. The decryption circuit 126 connected between the main circuit 122 and the testing circuit 180. For testing the main circuit 122, the test circuit 180 encrypts the test data/instruction, and transmits the encrypted test data/instruction to the decryption circuit 124. Then, the decryption circuit 124 decrypts the encrypted test data/instruction, and provides the decrypted test data/instruction to the main circuit 122. When receiving the decrypted test data/instruction, the main circuit 122 may transmit response data to the testing circuit 180. Finally, the testing circuit 180 can determine a test result according to the response data from the main circuit 124. It should be noted that the decryption circuit 126 may be included in the main circuit 122 in some embodiments of the invention. Because the communication between the main circuit 122 and the test circuit 180 has the encryption and decryption mechanisms by decryption circuit 124 and the decryption circuit 126, a hacker cannot access the main circuit with the correct data/instruction, so that it enhances the security of the main circuit.

In some embodiments of the invention, the die further comprises a non-volatile memory fuse. The non-volatile memory fuse stores values for determining the functional of the main circuit of the die 120, and the values in non-volatile memory fuse are set during testing. Therefore, in order to ensure the non-volatile memory fuse cannot be modified after the die saw process, the erasing operation of the non-volatile memory fuse is only supplied by the testing circuit 180. For example, the testing circuit 180 provides a high voltage to the non-volatile memory for performing an erasing operation. Since the communication channel between the non-volatile memory and the testing circuit 180 is removed after the die saw process, the content of the non-volatile memory fuse is protected.

Figure 4A:
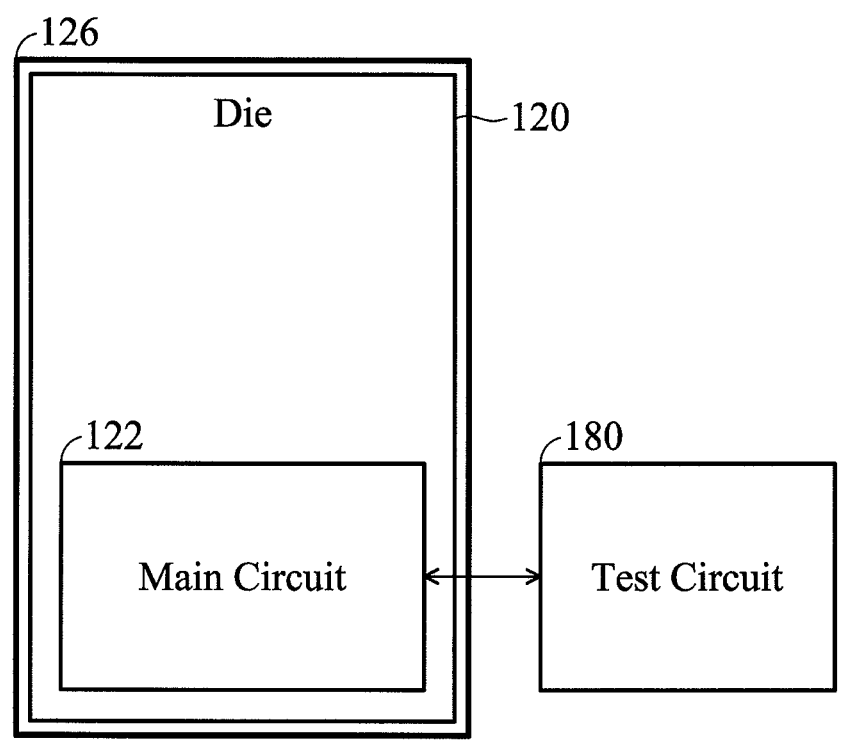
FIG. 4A is a schematic diagram illustrating an embodiment of a die and a testing circuit in accordance with an embodiment of the present invention.
Figure 4B:
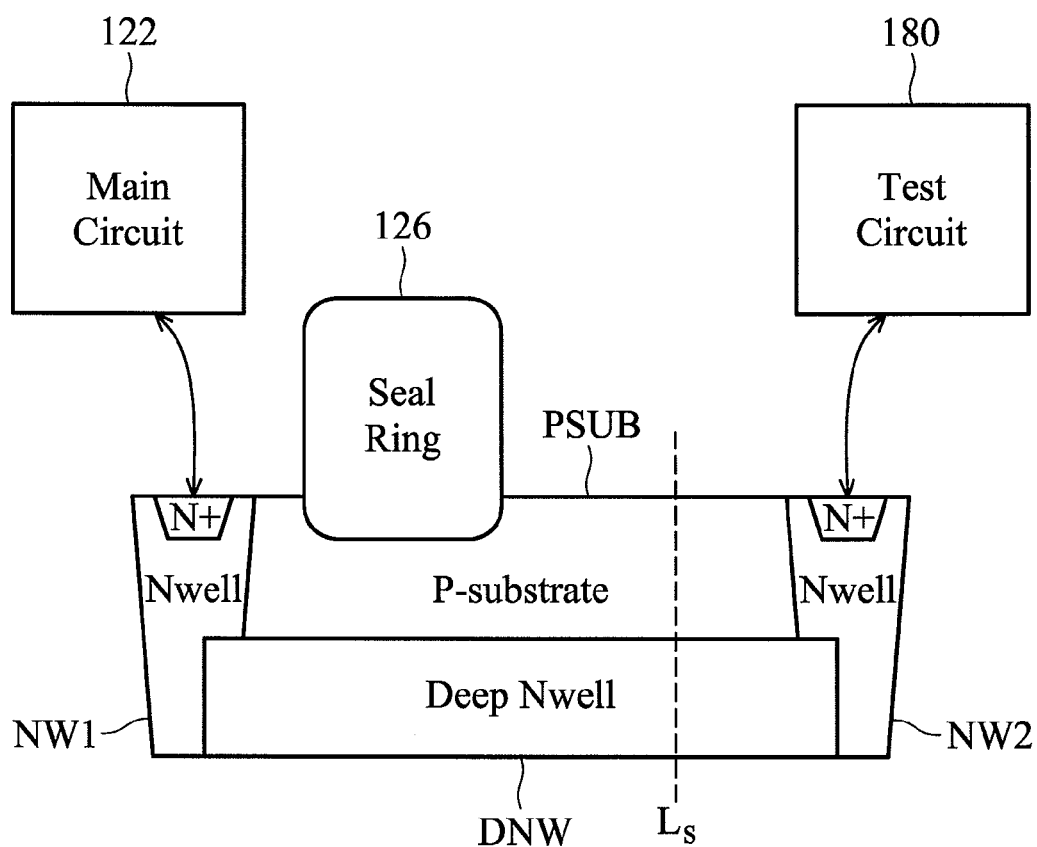
FIG. 4B shows a partial cross sectional side view of the semiconductor wafer in accordance with an embodiment of the present invention.

In some embodiments of the invention, in order to avoid introducing die-sawing stress and contaminants of a die 120, a seal ring may be formed to surround the die 120, as shown in FIGS. 4A and 4B. FIG. 4A is a schematic diagram illustrating an embodiment of a die and a testing circuit in accordance with an embodiment of the present invention. In the embodiment, the seal ring 126 may consist of metal layer, oxide layer, diffusion layer, or a combination thereof. Because the structure of the seal ring 126 is disposed outside of the die 120, the testing circuit 180 is difficult to electrically connect to the main circuit of the die 120 if the testing circuit 180 is disposed on the scribe area 160 outside the die area 140 as shown in FIG. 2. It should be noted that, although a metal layer or a diffusion layer can be a communication channel or a connection path between the main circuit 122 of the die 120 and the testing circuit 180, only if the seal ring 126 is broken to form an opening. However, the opening in the seal ring 126 may cause contaminants of the die 120, and the opening is also observable to a hacker, such that the risk of information steal is increased.

To solve the problems mentioned above, an embodiment of the invention provides a well for a communication channel between the main circuit of the die 120 and the testing circuit 180. For an example, FIG. 4B shows a partial cross sectional side view of the semiconductor wafer in accordance with the embodiment of FIG. 4A. Because the main circuit 122 and test circuit 180 may have different structures depending on their purposes or functions, FIG. 4B merely uses blocks to represent the main circuit 122 and test circuit 180 for simplification. As shown in FIG. 4B, the semiconductor wafer comprises a P-substrate PSUB, a deep N-well DNW, and N-wells NW1 and NW2, and an N+ diffusion N+ is formed in each of the N-well NW1 and NW2. The main circuit of the die 120 is connected to the N+ diffusion N+ of the N-well NW1, and the testing circuit 180 is connected to the N+ diffusion N+ of the N-well NW2. Since the deep N-well DNW is connected between the N-well NW1 and the N-well NW2, the communication channel between the main circuit of the die 120 and the testing circuit 180 can be accomplished. In the embodiment, the testing circuit 180 may transmit data or an instruction to the main circuit of the die 120 through the N-well NW2, the deep N-well DNW and the N-well NW1. Also, when receiving the data or instruction, the main circuit of the die 120 may respond to the testing circuit 180 through the N-well NW1, the deep N-well DNW and the N-well NW2. Due to the deep N-well DNW being formed in a layer that is lower than the layer of the seal ring 126, there is no need to break an opening on the seal ring 126, and communication between the main circuit of the die 120 and the testing circuit 180 can be established. It should be noted that the connection between the main circuit 122 and the testing circuit 180 can be performed by any layers of the die 120, such as a metal layer (not shown). Due to the metal layer is the upper and more visible than the wells, for improving the security, the connection between the main circuit 122 and the testing circuit 180 is performed by the wells NW1, DNW and NW2 in preferable embodiments.

In addition, after the tests of the die 120 finishes, the die 120 is cut off from the semiconductor wafer along the dotted line Ls in the die saw process, and the testing circuit 180 will be removed from the die 120. Also, the connection between the main circuit of the die 120 and the testing circuit 180 is performed by the deep N-well DNW, and the deep N-well DNW is broken after die saw process. Therefore, the connection between the main circuit of the die 120 and the testing circuit 180 is invisible after the die saw process.

Although the present invention and its advantages have been described in detail, it should be understood that various changes, substitutions and alterations can be made herein without departing from the spirit and scope of the invention as defined by the appended claim. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, process, machine, manufacture, and composition of matter, means, methods and steps, presently existing or later to be developed, that perform substantially the same function or achieve substantially the same result as the corresponding embodiments described herein may be utilized according to the present invention. Accordingly, the appended claims are intended to include within their scope such the process, machine, manufacture, and composition of matter, means, methods and steps. In addition, each claim constitutes a separate embodiment, and the combination of various claims and embodiments is with the scope of the invention.

What is claimed is:

1. A semiconductor wafer, having a die area and a scribe area, comprising:
    a die, formed on the die area of the semiconductor wafer, and having a main circuit; and
    a testing circuit, disposed on the scribe area of the semiconductor wafer, and electrically connected to the die for testing the main circuit,
    wherein the testing circuit further transmits test data to the main circuit,
    the main circuit transmits response data to the testing circuit when the main circuit receives the test data, and
    wherein the testing circuit determines whether the response data is equal to the test data,
    wherein the die further comprises a decryption circuit connected between the main circuit and the testing circuit, and
    wherein the testing circuit further encrypts the test data and transmits the encrypted test data to the decryption circuit, the decryption circuit decrypts the encrypted test data, and the main circuit transmits the response data according to the test data from the decryption circuit.

2. The semiconductor wafer of claim 1, further comprising:
    a seal ring, disposed outside of the die; and
    a well, formed below the seal ring, wherein the testing circuit is electrically connected to the die via the well.

3. The semiconductor wafer of claim 1, wherein the die further has a non-volatile memory fuse storing values for determining a function of the main circuit, and the testing circuit provides a high voltage to the non-volatile memory fuse for performing an erase operation or a program operation.

4. A testing method, for a semiconductor wafer having a die area and a scribe area, comprising:
    forming a die on the die area of the semiconductor wafer, wherein the die comprises a main circuit;
    forming a testing circuit on the scribe area of the semiconductor wafer; and
    electrically connecting the testing circuit to the die for testing the main circuit;
    further comprising:
        using the testing circuit to transmit test data to the main circuit;
        receiving response data from the main circuit by the testing circuit; and
        determining whether the response data is equal to the test data,
    wherein the main circuit of the die generates the response data according to the test data,
    wherein the die comprises a decryption circuit connected between the main circuit and the testing circuit, and the testing method further comprising:
        encrypting the test data;
        transmitting the encrypted test data to the decryption circuit; and
        decrypting the encrypted test data by the decryption circuit, and
    wherein the main circuit transmits the response data according to the test data from the decryption circuit.

5. The testing method of claim 4, further comprising:
    forming a seal ring disposed outside of the die; and
    forming a well electrically connecting the testing circuit to the main circuit of the die,
    wherein the well is disposed below the seal ring.

6. The testing method of claim 4, wherein the die further has a non-volatile memory fuse storing values for determining a function of the main circuit, and the testing method further comprises: using the testing circuit to provide a high voltage to the non-volatile memory fuse for performing an erase operation or a program operation.

* * * * *